United States Patent [19]

Nigol

[11] 4,346,255

[45] Aug. 24, 1982

[54] OVERHEAD ELECTRICAL CONDUCTOR SYSTEM INCLUDING SUBSPAN OSCILLATION AND AEOLIAN VIBRATION ABSORBER FOR SINGLE AND BUNDLE CONDUCTORS

[75] Inventor: Olaf Nigol, Etobicoke, Canada

[73] Assignee: Slater Steel Industries Limited, Hamilton, Canada

[21] Appl. No.: 147,096

[22] Filed: May 7, 1980

[30] Foreign Application Priority Data

Jan. 24, 1980 [CA] Canada .................................. 344328

[51] Int. Cl.$^3$ .......................... H02G 7/14; H02G 7/12
[52] U.S. Cl. ....................................... 174/42; 174/146
[58] Field of Search .................. 174/42, 146; 188/306, 188/317

[56] References Cited

U.S. PATENT DOCUMENTS

| 1,051,054 | 1/1913 | Anderson | 188/306 X |
| 2,727,085 | 12/1955 | Tornquist et al. | 174/42 |
| 3,128,858 | 4/1964 | Kumezawa | 174/42 X |

FOREIGN PATENT DOCUMENTS

| 217534 | 10/1961 | Austria | 174/42 |
| 1015825 | 8/1977 | Canada | 174/42 |
| 2510423 | 9/1976 | Fed. Rep. of Germany | 174/42 |
| 1061704 | 12/1953 | France | 188/317 |

Primary Examiner—Laramie E. Askin
Attorney, Agent, or Firm—Fleit & Jacobson

[57] ABSTRACT

In a vibration absorber for use with aerially suspended conductors and cables, there is described an improved vibration absorber wherein wind or turbulence induced vibrations resulting in travelling waves on conductors and cables are absorbed so as to prevent damage to or failure of conductors and related hardware due to fatigue. Known devices, particularly dampers and spacer dampers, attempt to control merely the amplitude of the waves produced on the conductor and are therefore ineffective in preventing the formation of such waves and the damage that may result. In this invention, a vibration absorber comprises a piston and cylinder device whereby a travelling wave displaces the piston or the cylinder relative to one another causing a fluid contained within the cylinder to be displaced through an orifice in the piston. The absorbing system thus defined has a mechanical dissipative impedance of value R to inhibit the reflection of a wave propagated on the conductor whereby the wave is absorbed. The value of R is in the range of $0.5\sqrt{TM}$ to $3.0\sqrt{TM}$ where T is the tension of the conductor and M is the mass of the conductor per unit length.

9 Claims, 9 Drawing Figures

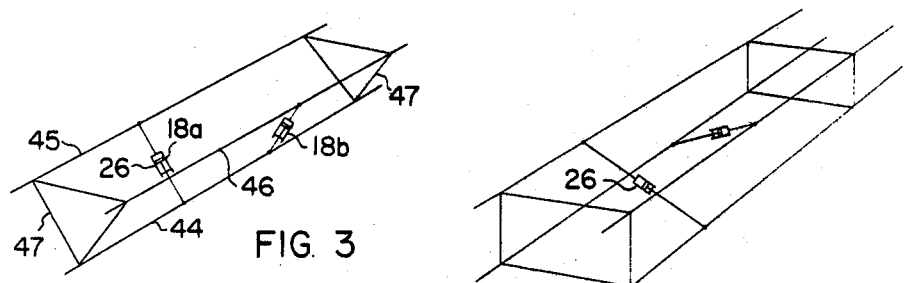
FIG. 3
FIG. 4
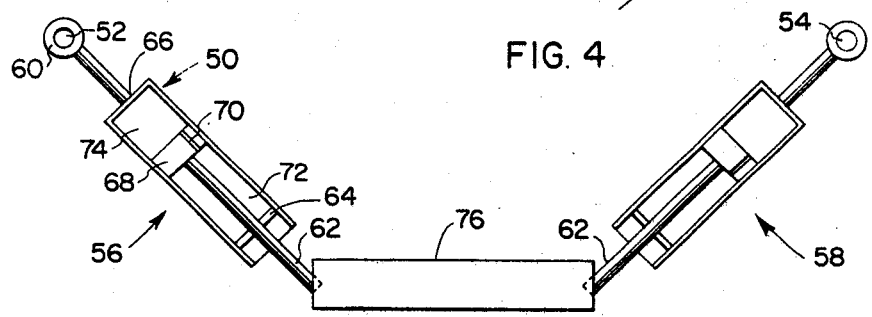
FIG. 5
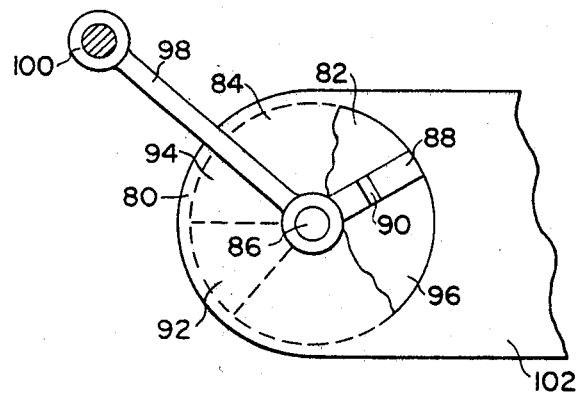
FIG. 6

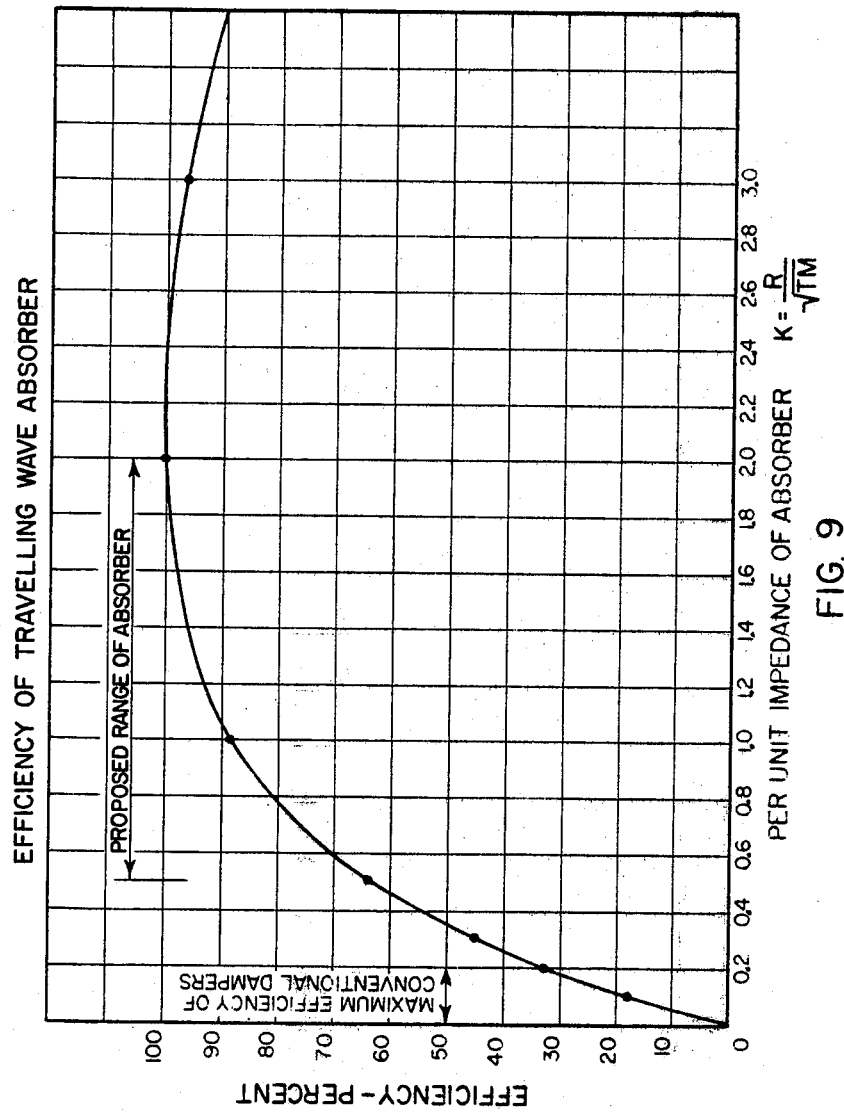

OVERHEAD ELECTRICAL CONDUCTOR SYSTEM INCLUDING SUBSPAN OSCILLATION AND AEOLIAN VIBRATION ABSORBER FOR SINGLE AND BUNDLE CONDUCTORS

The present invention relates to electrical power transmission and communication systems and in particular to vibration absorbers for use with aerially suspended conductors and cables.

It is common practice to transmit electrical power and communication signals by means of a number of aerially suspended conductors and cables. The conductors and cables are supported above the ground by means of towers which are spaced at appropriate intervals.

One of the problems with overhead conductors and cables is vibration. Vibration affects the overall cost, reliability and life of power and communication circuits.

It has been recognized that an aero-elastic system such as constituted by an overhead transmission, distribution and/or communication line is subject to three different types of vibration phenomena. Unless these phenomena are eliminated or severely reduced, they may result in premature failure of the conductors or cables, (hereinafter referred to collectively as conductors), disruption of service or damage to the support structures. The vibrational modes are observed as standing waves and have been characterized in the art as follows.

A low frequency, large amplitude motion of conductors that usually occurs under wind and ice conditions is known as conductor galloping. The amplitudes of the galloping motion can reach a value equal to twice the conductor sag and the frequency can range from a single loop or fundamental span frequency of 0.1 Hz to a 3 loop, third harmonic frequency of 1.0 Hz.

A medium amplitude, medium frequency motion of bundle conductors is known as sub-conductor oscillation. The amplitude of this oscillation is mainly in a horizontal plane and can exceed the normal bundle spacing. The frequency of this oscillation is typically in the range of 1 to 3 Hz.

A high frequency and small amplitude motion that occurs on both single and bundle conductors is known as aeolian vibration. This vibration can reach an amplitude of two or three times the conductor diameter. The frequency of aeolian vibration is typically in the range of about 5 Hz to 70 Hz.

In practice, the effect of conductor galloping is to require the clearance between different phase conductors of a transmission line to be increased to at least two times that required by purely electrical criteria. This of course increases the tower height and the cost of the overhead power transmission systems. The cost of towers and other line components is further increased by the dynamic loads produced by conductor galloping.

If sub-conductor and aeolian oscillation is not adequately controlled, it can cause conductor and hardware damage and failure due to fatigue of materials.

It is with the suppression and absorption of sub-conductor oscillation and aeolian vibration that the present invention is primarily concerned.

The prior art has recognized the need to control vibration in overhead conductors and has accordingly directed its attention to devices which control the observed phenomena.

Various devices have been proposed to control conductor galloping and some have met with limited success. However, previous attempts to control the effect of aeolian vibration and sub-conductor oscillation have concentrated upon controlling the amplitude of the standing waves that are produced on the conductor. To satisfy the criteria that apply to amplitude control, the devices presently used have a low damping capacity with damping factors typically in the range of 0.1 to 0.35 of the mechanical impedance of the conductor and therefore reduce the amplitude of the standing waves only in combination with the internal damping of the conductor. When the normal conductor tension is increased beyond 20 percent of their rated strength, the internal damping of conductors is greatly reduced and as a result the amplitude of standing waves increases to a point where damage would occur to the conductor and hardware by metal fatigue.

Therefore, these devices are not entirely satisfactory since they are designed to reduce the amplitude of vibration and therefore do not avoid the formation of the standing waves and the potential damage to the power transmission system that may therefore result.

A further problem associated with prior art dampers used on bundle conductors is that they invariably require a large mass and a resilient member within their mechanism to reduce the amplitude of vibration. This resilient member has conventionally taken the form of a spring although elastomeric members have also been used. Such members must be designed for a service life in the order of 20 years and are therefore relatively expensive. Further, the spring-mass system is inherently frequency dependent so its effectiveness is limited to a certain range of frequencies of oscillation and the dampers also require careful and precise placement along the span of the conductor. To be effective, such dampers require placement at the lambda by four ($\lambda/4$) wave point of the centre aeolian frequency of the conductor. Further, the use of a large mass imposes additional stresses on the conductors or cables which further limits the tension that may be applied to the conductors.

In order to reduce the additional loads placed on the conductors by the hardware, the prior art has sought to combine the properties of the spacers used to maintain the conductors at the required spacing and the dampers used to control the vibration of the conductor. Accordingly, spacer dampers have been developed which seek to combine within one structure the properties of a spacer and a damper. Although these have met with some success, they are necessarily a compromise between the respective properties required from a spacer and a damper.

It is therefore an object of the present invention to provide a vibration absorber in which the above disadvantages are obviated or mitigated.

According to a further aspect of the present invention, there is provided an overhead electrical conductor system comprising, tower means for suspending conductor means, conductor means suspended between intermittently spaced tower means, absorbing means for absorbing travelling waves in the conductor means, the absorbing means comprising first and second members movable with respect to each other, the absorbing means having a dissipative mechanical impedance of value R in the range of $0.5\sqrt{TM}$ to $3.0\sqrt{TM}$, where T is the tension in the conductor means and M is the mass of the conductor means per unit length, platform means spaced from the conductor means; and attachment means provided on opposing ends of the first and second members for connecting the absorbing means between the conductor means and the platform means, wherein the dissipative mechanical impedance R of the absorbing means is effective to absorb the energy of travelling waves generated on the conductor means.

The principle of the present invention is based upon a further understanding of the vibration phenomena. The applicant has recognized that aeolian vibration and sub-conductor oscillation derive their excitation from the minute forces associated with the release of vortices on the leeward side of conductors and cables when conductors and cables are subjected to a steady air flow across their surface. It is believed that the excitation of aeolian vibration is derived from the detachment of the vortices and that sub-conductor oscillation is derived from the flow of the released vortices past the leeward conductor.

This release of vortices produces a travelling wave which proceeds along the span in opposite directions from its origin towards the suspension points. This in turn releases other vortices to reinforce and amplify the wave motion. When the travelling wave arrives at the suspension point of the conductor, that is the attachment point of the conductor to the supporting structure, it is reflected as a negative wave due to the rigidity of the support point. The damping characteristics of the conductor and the suspension hardware are very small so that attenuation of the travelling waves is also very small. This allows the travelling wave to make a large number of passes in a given span to thereby generate a standing wave having an amplitude of constant value, the amplitude being determined by the damping of the system.

The applicant has recognized that the vibration phenomena may be avoided by preventing the formation of a standing wave rather than attempting to control the amplitude of the standing wave. Since it is not feasible to prevent vortex detachment, the present invention provides an absorber which will absorb the travelling wave and prevent its reflection back along the conductor. This is achieved by matching the dissipative impedance of the absorber with the characteristic mechanical impedance of the conductor. The characteristic mechanical impedance of a conductor is defined as the ratio of force and velocity amplitudes of the travelling waves. Since the mechanical impedance of the conductor is a function of the tension in the conductor and the mass of the conductor per unit length, an absorber can be designed to match the mechanical impedance of the conductor for any given installation. Further, because the use of a damper for absorbing the wave does not require a frequency dependent resilient system, the absorber may be placed at any convenient location along the span of the conductor and not, as previously described, just at λ/4 wavepoints of the centre aeolian frequency in the conductor.

Under ideal conditions where the absorber is installed at any point on the conductor, the absorber impedance R should be $k\sqrt{TM}$ where T is the tension of the conductor and M is the mass of the conductor per unit length and k is the damping factor which, under the aforementioned ideal conditions, equal 2.0 to reflect the fact that the conductor extends in both directions from the absorber. It has been found that significant improvements in vibration control may be achieved by selecting an absorber impedance R in the range $0.5\sqrt{TM}$ to $3.0\sqrt{TM}$. Thus increases in T and M due to icing of the conductors will not unduly affect the operation of the absorber.

The principle may be applied to sub-conductor oscillation by utilizing the inertial mass of other bundle conductors to provide support for the second member. Thus, by arranging a vibration absorber at an angle 45° in the range of 30° to 60° from the vertical and horizontal planes, it will absorb the travelling waves associated with the build-up of both vertical aeolian vibration and horizontal sub-conductor oscillation.

Embodiments of the invention will now be described by way of examples with reference to the accompanying drawings, in which:

FIG. 3 is a diagrammatic representation of an installation using three conductors;

FIG. 4 is a diagrammatic representation of an installation using four conductors;

FIG. 5 is a diagrammatic representation of a further embodiment of an absorber for use with a two-conductor bundle;

FIG. 6 shows an alternative form of absorber for use with a two-conductor bundle;

FIG. 9 is a graph illustrating absorption efficiency as a function of damping factor k.

Figure 1:
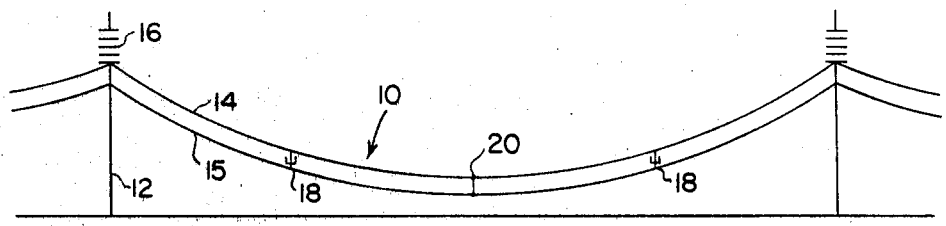
FIG. 1 is a diagrammatic representation of a portion of an aerially suspended power transmission system.

Referring now to FIG. 1 an electrical power transmission system 10 includes a number of towers 12 (two of which are shown) which are used to support conductors 14, 15 above the ground. It will be appreciated that whereas a two-conductor bundle has been shown in FIG. 1, the arrangement is representative of aerially suspended power transmission systems in which a number of phases, each phase consisting of single or bundles of two, three, four or more conductors, are suspended between common support points on the towers. The conductors 14, 15 are connected to the towers 12 by means of insulator strings 16. Various arrangements are available for attaching the insulator strings to the towers and likewise for attaching the insulator strings to the conductors. Since these are of conventional design, they will not be described in further detail herein.

Vibration absorbers 18 are located at appropriate points on the conductors 14, 15 between the towers 12 and rigid spacers 20 of known construction.

Wind blowing across the surface of the conductors 14, 15 will cause a vortex to form on the leeward side of the conductor. Detachment of the vortex will provide a small force impulse and a displacement of the conductor which will proceed as travelling waves towards each tower 12.

Figure 2:
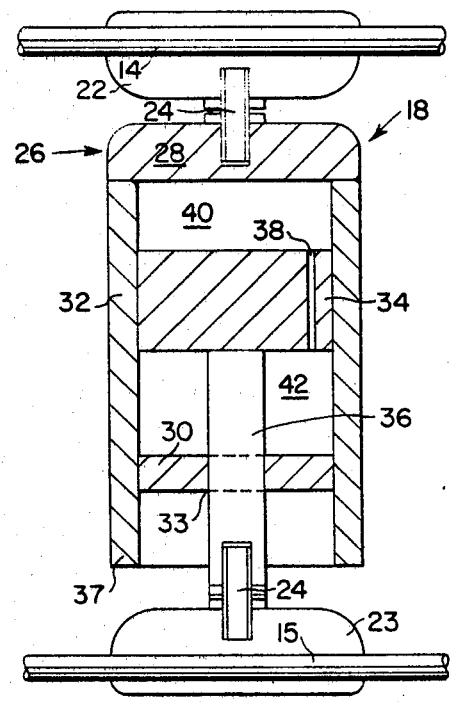
FIG. 2 is a cross-sectional view of a vibration absorber for use between two conductors of a bundle.

Referring now to FIG. 2 the vibration absorber 18 comprises a pair of attachment means in the form of clamps 22, 23 which encompass the respective conductor 14, 15 to secure the absorber 18 to the conductors. The clamps 22, 23 may be of any suitable form such as are conventionally used for connecting support hardware to conductors.

The clamp 22 is attached by means of an articulated joint 24 to a first member or body 26. The body 26 has end members 28 and 30 which are interconnected by a cylindrical wall portion 32. The body portion 26 provides an air tight sealed container.

The wall portion 32 extends beyond the end member 30 to form a skirt 37. The skirt 37 protects the aperture 33 from icing and thereby ensures that the piston rod 36 is freely moveable.

A piston 34 is slidably received within the wall portion 32 and a piston rod 36 is connected to the piston 34. The piston rod 36 extends through the end member 30 by means of a tightly fitted aperture 33. Seals may be provided between the end member 30 and the piston rod 36 if desired. An orifice 38 is provided through the piston 34 and thereby interconnects chambers 40 and 42 formed between the piston 34 and the end members 28 and 30 respectively.

The detachment of a vortex from the conductor 14 causes a travelling wave to be propagated. As the travelling wave approaches the absorber it displaces the body 26. However, because of the damping characteristic of the absorber and the inertial mass of the conductor 15, the piston 34 and rod 36 remain stationary. Thus the volume of the chamber 42 is decreased and air or some other suitable fluid is displaced through the orifice 38 into the chamber 40. The energy required to displace the fluid is derived from the travelling wave and therefore the wave is largely absorbed by the absorber 18 having proper sizing of the orifice 38 for a given fluid. The travelling wave therefore is not reflected at the connection of the clamp 22. The wave travelling toward the tower is reflected at the tower and travels to the absorber where it is also absorbed. In the result, the formation of a standing wave is thereby avoided.

With reference to FIG. 9, it can be seen that absorber efficiencies vary as a function of the damping factor k. Known spacer dampers which typically have damping factors in the lower ranges as indicated can be seen to be relatively inefficient in absorbing travelling wave energy. However, it can also be seen that, as contemplated by the present invention, the damping required from the vibration absorber to provide optimum absorption of the travelling waves on the conductor is equal to $2.0\sqrt{TM}$ where T is the tension in the conductor in pounds and M is the conductor mass per unit length. It has been found however that satisfactory absorption of the travelling wave is achieved if the damping of the absorber is between $0.5\sqrt{TM}$ and $3.0\sqrt{TM}$. As can be seen from FIG. 9, the travelling wave absorber has an efficiency of approximately 65% when $k=0.5$, such efficiency being approximately 15% higher than that obtainable with conventional dampers. The efficiency of the absorber increases to 100% when $K=2.0$, and gradually decreases to a value higher than 90% when $k=3.0$. Thus, given a specific conductor in a specific design condition, it is possible to provide a vibration absorber which will absorb the travelling waves propagated on the conductor over a practical range of operating conditions.

For the system shown in FIG. 2 it should be noted that the inertial mass of the conductor 15 provides a reasonably stationary working platform. Similarly the conductor 14 will provide a reasonably stationary working platform for absorption of a travelling wave in conductor 15.

In the generic sense a working platform may be regarded as any convenient inertial mass that can be connected to the conductor on which it is desired to absorb travelling waves through an absorber such that when the travelling wave reaches the point of attachment of the absorber to the conductor and begins to displace the conductor at the attachment point, the platform means, through the inertia of its mass, provides a degree of physical restraint such that the elements of the absorber move with respect to each other to dissipate energy.

The platform means can be one of several elements in the system and may be connected either directly to the operative absorber element or through the intermediary of supplementary absorber elements interconnected, for instance, by a frame. It will be observed, for example, that certain embodiments taught herein utilize the conductors, 15, 14, 44, 45 and 46 as platform means or a working platform.

The vibration absorber 18 does not utilize a spring or resilient member and as such as not frequency dependent. This enables the absorber to be effective over a wide range of conditions. Where a rigid spacer frame is required between the towers, the conductor is effectively divided into two sub-spans and an absorber is applied in each sub-span.

The embodiment shown in FIG. 2 is useful for a two conductor bundle. The embodiments of FIGS. 3 and 4 show arrangements in which the same vibration absorbers are used with multiple conductor bundles to absorb the travelling waves associated with aeolian and sub-conductor oscillations.

FIG. 3 shows an arrangement in which the absorber 18 is employed with a three conductor bundle. The conductors 44, 45, 46 are located at the apexes of an equilateral triangle and rigid spacers 47 are used to maintain the desired spacing at appropriate intervals. An absorber 18a extends from the conductor 44 to the conductor 45 and similarly an absorber 18b extends from the conductor 44 to the conductor 46. Each absorber 18a, 18b is constructed in the manner shown in FIG. 2.

Assuming a vortex detaches from the conductor 45, a travelling wave will move along the conductor 45 and will cause relative displacement of the body 26 of the damper 18a. The conductor 44 will provide a working platform for the absorber 18a so that the travelling wave is absorbed.

Similarly a disturbance on conductor 46 will be absorbed by the absorber 18b. If a disturbance occurs on the conductor 44, the conductors 45 and 46 provide a working platform to enable the absorbers 18a, 18b to absorb the wave.

FIG. 4 shows an arrangement in which absorbers are mounted on a four-conductor bundle. The conductors are arranged on the corners of a square and the absorbers extend between diagonally opposed conductors. In this manner a working platform is provided for each conductor by the diagonally opposed conductor.

The embodiments shown in FIGS. 5 to 8 show arrangements in which a plurality of absorbers are mounted on a common support frame.

FIG. 5 shows a vibration absorber 50 which is used to control vibrations in a pair of conductors 52 and 54. The absorber 50 includes a pair of piston and cylinder devices, 56 and 58, connected respectively to the conductors 52 and 54. The piston and cylinder devices 56 and 58 are disposed at 45° to the horizontal and vertical planes and as such are effective in absorbing travelling waves in both the vertical and horizontal planes. Since each of the piston-cylinder devices 56 and 58 is identical, only one will be described herein.

The piston and cylinder device 56 includes a clamp 60 which encompasses and is secured to the conductor 52.

The clamp is connected to a first member or cylinder 66. A piston 68 is slidably received within the cylinder 66 and is attached to a piston rod 62 which extends through an end wall 64 of cylinder 66 by means of a tightly fitting aperture. An orifice 70 is provided in the piston 68 to permit flow of air or some other suitable fluid between chambers 72 and 74 defined in the cylinder 66 by the piston 68.

The piston rod 62 is secured to a common support frame 76. The frame 76 should be as light as possible to reduce the loading on the conductors. It is not necessary to provide a large mass since the conductors provide a stationary working platform.

Upon a disturbance occurring on the conductor 52, the support frame 76, piston and cylinder device 58 and the second conductor 54 constitute a relatively stationary inertial mass and the cylinder 66 is displaced relative to the piston 68 to cause a displacement of working fluid between the chambers 72 and 74. This absorbs the energy of the travelling wave and thereby inhibits the formation of a standing wave.

A similar arrangement is shown in FIG. 6 in which a rotational piston and cylinder device is utilized. The piston and cylinder device comprises a peripheral wall 80 with a pair of radially extending end walls 82, 84. A shaft 86 extends between and is supported by the end walls 82, 84 and a radial vane 88 is integrally formed with the shaft 86. The vane 88 extends into sealing contact with the peripheral wall 80 and has an orifice 90 extending therethrough.

A partition 92 is provided within the cylinder and is attached to the peripheral wall 80. A pair of chambers 94 and 96 are defined between the partition member 92 and the vane 88.

A crank 98 is attached to one end of the shaft 86 and is connected to a clamp member 100 which encompasses the conductor. The piston and cylinder device is supported on a support frame 102.

It will be apparent that a travelling wave propagated on the conductor will cause relative movement between the vane 88 and the peripheral wall 80 and thereby displace air or some other suitable fluid through the orifice from the chamber 96 to the chamber 94. This will absorb the energy of the travelling wave and thereby inhibits the formation of a standing wave.

Figure 7:
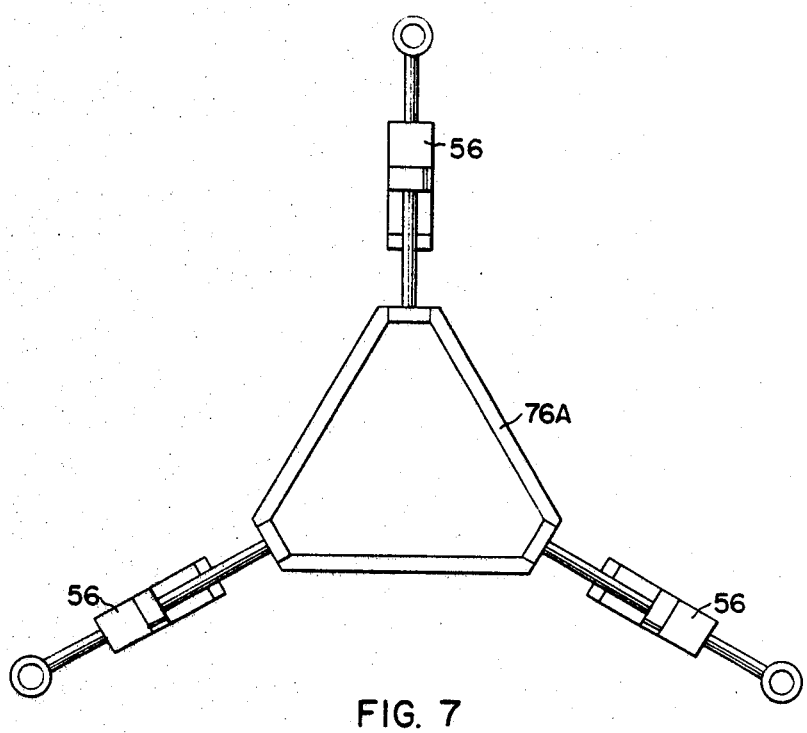
FIG. 7 shows an arrangement suitable for a three-conductor bundle.

FIG. 7 shows an arrangement in which piston and cylinder devices similar to those described in FIG. 5 are utilized with a three-conductor bundle. The details of the piston and cylinder devices will not be repeated since they are similar to those shown in FIG. 5. It will be appreciated that with piston and cylinder devices extending upwards the piston and cylinder components are oriented so that the skirted portion of the cylinder projects downwardly. In this manner, accumulations of ice which could otherwise impede the operation of the piston and cylinder device are avoided. A support frame 76A is used to maintain the piston and cylinder devices at the apexes of the triangle. With this arrangement the relatively stationary mass is provided by the undisturbed conductors.

Figure 8:
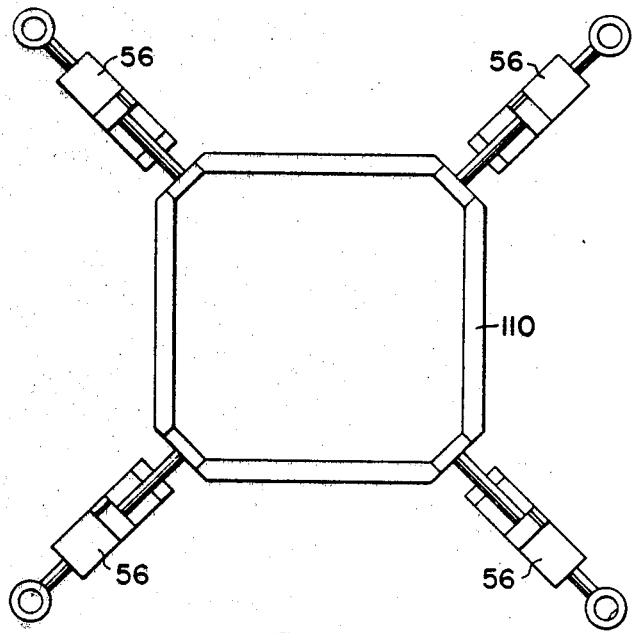
FIG. 8 is a diagrammatic representation of an arrangement suitable for a four-conductor bundle.

FIG. 8 shows an arrangement for use with a four-conductor bundle. Again piston and cylinder devices similar to those shown in FIG. 5 are utilized at the corners of a square support frame 110. This enables the undisturbed conductors to provide the necessary stationary platform to enable damping of the disturbed conductor.

It will be apparent that the various types of dampers shown in FIGS. 5 to 8 can be substituted for use with either three or four conductor bundles. For example a three-conductor bundle could utilize a rotational damper similar to that shown in FIG. 6 at the apex of a triangular support frame.

A four-conductor bundle could utilize a pair of diagonal struts similar to those shown in FIG. 6 to provide damping between diametrically opposite conductors of the bundle.

The absorbers described herein have utilized fluid displacement through an orifice to achieve the desired damping effect. It should be apparent, however, that alternative arrangements could utilize Couloumb damping by means of overlapping Teflon* discs or plates or other suitable forms of damping.
*Trademark It is also possible to utilize the damper on a single conductor. In this situation it is necessary to provide a working platform by means of a mass. This mass may be located within the cylinder of the damper or could be attached to one end of the piston rod. The mass would be supported relative to the cylinder by means of a spring which would be chosen so that the resonant frequency of the spring mass system is below the excitation frequency of the vortex detachment frequency.

In all the embodiments described, the absorber provides a dissipative impedance $R = k\sqrt{TM}$ where damping factor k lies between 0.5 and 3.0. This is achieved by suitable sizing of the orifice for a given fluid or by choice of frictional material and loading for a Couloumb absorber. Whilst air may be used as the working fluid it is also possible to use a fluid such as silicone oil which offers less variation of viscosity over a wide temperature range than hydrocarbon oils, thereby maintaining the impedance R within acceptable limits.

I claim:

1. An overhead electrical conductor system comprising:
   tower means for suspending conductor means;
   conductor means suspended between intermittently spaced tower means;
   absorbing means for absorbing travelling waves in said conductor means, said absorbing means comprising first and second members movable with respect to each other, said absorbing means having a dissipative mechanical impedance of value R in the range of $0.5\sqrt{TM}$ to $3.0\sqrt{TM}$, where T is the tension in the conductor means and M is the mass of the conductor means per unit length;
   platform means spaced from said conductor means; and
   attachment means provided on opposing ends of said first and second members connecting said absorbing means between said conductor means and said platform means, wherein said dissipative mechanical impedance R of the absorbing means is effective to dissipate energy of travelling waves generated on said conductor means.

2. The system of claim 1 wherein said conductor means comprise a plurality of aerially suspended conductors, said attachment means of said first member being connected to one of said conductors, and said attachment means of said second member being connected to another of said conductors which forms said platform means.

3. The system of claim 2 wherein said conductor means comprises four aerially suspended conductors arranged in a quadrilateral configuration and said absorbing means is interconnected between diagonally adjacent conductors.

4. The system of claim 3 wherein said first and second members constitute a piston and cylinder device, said piston having an orifice formed therethrough to allow for the passage of a fluid disposed within said cylinder, the size of said orifice being chosen relative to the viscosity of said fluid to provide said absorbing means with a dissipative mechanical impedance within the said range.

5. The system of claim 4 wherein said piston reciprocates relative to said cylinder.

6. The system of claim 4 wherein said piston is rotatable relative to said cylinder.

7. The system of claim 2 wherein said second member is connected to said another of said conductors by means of frame means disposed between said conductors.

8. The system of claim 7 wherein said absorbing means extends between said conductors and said frame means to thereby suspend said frame means between said conductors.

9. The system of claim 7 wherein said conductor means includes horizontally adjacent conductors, and wherein said frame means is disposed in spaced parallel relationship to a line extending transversely between two such horizontally adjacent conductors such that said absorbing means extends diagonally between said conductors and said frame means.

* * * * *